April 17, 1956 F. H. STAMPER 2,742,339

SCANNING RECORDER

Filed Aug. 25, 1953 2 Sheets-Sheet 1

INVENTOR.
F. H. Stamper

BY

ATTORNEY

INVENTOR.
F. H. Stamper
BY
[signature]
ATTORNEY

United States Patent Office 2,742,339
Patented Apr. 17, 1956

2,742,339

SCANNING RECORDER

Furman Harrison Stamper, Los Angeles, Calif., assignor to Bendix Aviation Corporation, North Hollywood, Calif., a corporation of Delaware Application August 25, 1953, Serial No. 376,316

9 Claims. (Cl. 346—139)

This invention relates to electrical recorders in which a stylus periodically scans a paper record strip and makes marks thereon when electrically energized. More particularly, it relates to the type of recorder disclosed in U. S. Patent No. 2,614,903, issued October 21, 1952, in which a long resilient stylus member extends from a rotating drum positioned within a closed track against which the free end of the stylus member rides, the track having a straight section parallel to the recording paper for guiding the stylus in a straight path thereacross. This construction has the advantages that it produces straight line scanning, is very simple and inexpensive, and requires little power, so that it can be driven by a small and inexpensive electric motor. However, as previously constructed, recorders of this type were unreliable at extremely high scanning speeds and had to be rather carefully adjusted to insure proper contact between the stylus and the record paper.

An object of the invention is to increase the possible speed of operation of a recorder of the type described.

Another object is to increase the reliability and greatly reduce the need for adjustment.

Another object is to provide a structure that is substantially self-adjusting to compensate for stylus wear.

Other more specific objects and features of the invention will appear from the description to follow.

Briefly, the foregoing objects are achieved by providing a stylus member and stylus track of such shapes that the stylus can slide laterally with respect to the track and so angularly positioned with respect to the paper that the outward force on the stylus resulting from both its inherent resilience and the centrifugal force developed from its rotation wedge it into firm contact with the paper, even at very high speeds and despite shortening of the stylus tip from wear.

A full understanding of the invention may be had from the following detailed description with reference to the drawing, in which.

Figure 1:
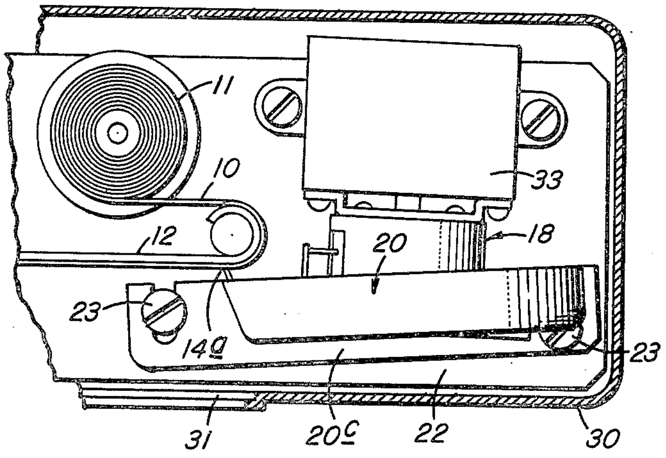
Fig. 1 is a plan view of a portion of a recorder using a stylus mechanism in accordance with the invention, the outer casing being shown in section.
Figure 2:
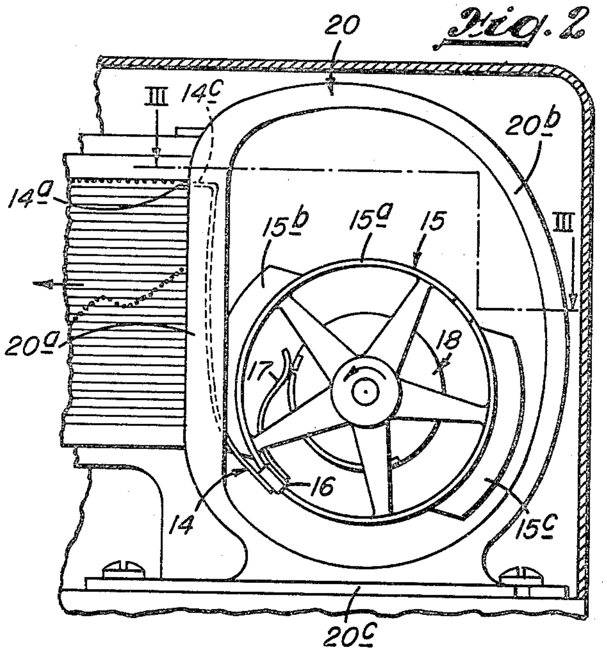
Fig. 2 is a front elevation of the apparatus shown in Fig. 1.

Referring first to Figs. 1 and 2, there is shown a record sheet consisting of a paper tape 10 which during operation of the recorder is slowly unwound from a roll 11 and drawn around the end of a backing plate 12 and across the front of that plate by a tape-pulling mechanism not shown. Record marks are produced on the record sheet 10 by the tip 14*a* of a stylus member 14 which is repeatedly dragged across the record sheet 10 from top to bottom and has applied thereto electrical impulses, the timing of which determines the vertical position of the marks on the record sheet. The present invention resides primarily in the stylus structure and the mechanism for moving it across the record sheet 10.

The stylus member 14 consists of a length of spring wire, one end of which is secured to and extends approximately tangentially from the periphery of a rotating stylus carrier 15 in the form of a wheel, and the free end or tip 14*a* of which contacts the record sheet 10 and constitutes the actual stylus. The opposite or anchored end of the stylus member 14 may be soldered to a spring clip 16 of channel shape to engage the rim 15*a* of the carrier wheel 15. The edges of the rim 15*a* are notched to receive the clip 16 and positively locate it in a desired circumferential position thereon while permitting rapid change of stylus assemblies by simply removing the clip 16 of one assembly from the stylus carrier and substituting a new clip and stylus assembly. One end of the clip 16 may be extended and a brush element 17 soldered thereto for making electrical connection to the stylus 14. This brush member 17 cooperates with a stationary contact structure 18 which is fully described in the aforementioned Patent No. 2,593,068 and does not constitute a part of the present invention. The latter relates only to the structure of the stylus member and its associated driving and guiding structure.

The stylus member 14 consists of two substantially straight sections 14*b* and 14*c*, respectively, the first section 14*b* being relatively long and extending approximately tangentially from it point of attachment to the carrier 15, and the other section 14*c* being relatively short and extending substantially at right angles to the longer section and terminating in the tip 14*a*.

During rotation of the carrier 15, the end section 14*c* of the stylus member is guided by a closed track 20 which surrounds or encloses the carrier 15. This track 20 comprises a straight guide member 20*a* extending vertically and parallel to the record sheet 10 in closely juxtaposed relation thereto, and an integral, generally curved section 20*b* interconnecting the lower and upper ends of the guide member section 20*a*. The track 20 may be formed of any suitable material and may be molded from plastic and provided with an integral base 20*c* whereby it can be attached to the base 22 of the recorder, as by screws 23, the base portion 20*c* having slots therein through which the screws pass for permitting adjustment of the track toward and away from the record sheet 10.

Figure 3:
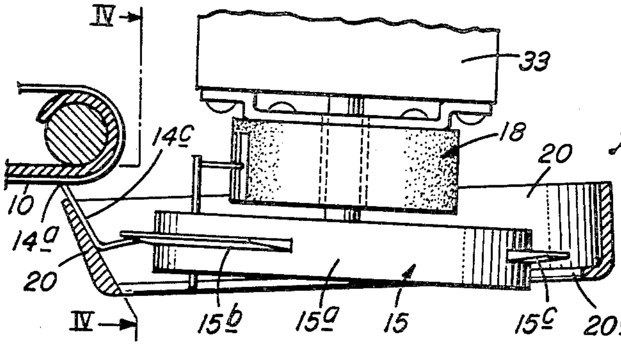
Fig. 3 is a horizontal sectional view taken along the line III—III of Fig. 2.

The guide member portion 20*a* of the track is straight and flat and is inclined on its inner surface at an acute angle to the record sheet 10, as clearly shown in Fig. 3, so that the outward force exerted by the stylus against the guide member 20*a*, as a result of the inherent resilience of the stylus and centrifugal force, urges it to slide laterally along the guide until it engages and is stopped by the record sheet 10, thereby insuring positive electrical contact between the stylus tip 14*a* and the record sheet. The long section 14*b* of the stylus member is so oriented with respect to the clip 16 that the short stylus section 14*c* extending at right angles therefrom lies flat against the guide member 20*a* during its traverse thereof, as shown in Fig. 3. The length of the section 14*c* will be reduced by wearing away of the stylus tip 14*a* in service, but it does not affect the operation materially even after a large portion has been lost.

The curved portion 20*b* of the track 20 merges into the upper and lower ends of the guide member section 20*a* but is not inclined in the same manner as the guide member section 20*a*. Instead, the inner surface of this section extends laterally approximately perpendicular to the axis of rotation of the carrier 15, as shown in Fig. 3. A rim 20*d* may be provided at the front edge of the track to stiffen it, but the rear end is preferably open.

It will be observed (Fig. 2) that the carrier 15 is positioned near the lower end of the guide 20*a*, so that although the long section 14*b* of the stylus member extends clear of the peripheral surface of the carrier at the time the stylus tip first engages the upper portion of the record sheet 10, the section 14*b* winds around the carrier 15 (Fig. 6) as the latter rotates and carries the stylus tip 14*a* through its scanning path across the record sheet. The lower portion of the track section 20*b* is nearly concentric to the carrier 15 and maintains the stylus largely wrapped around the carrier while the latter moves through approximately half a revolution from the position shown in Fig. 2. Thereafter (Figs. 7 and 8) the track 20*b* follows a generally spiral path to the upper end of the guide member section 20*a*, and during traverse by the stylus of this portion of the track it unwinds from the carrier 15.

Figure 4:
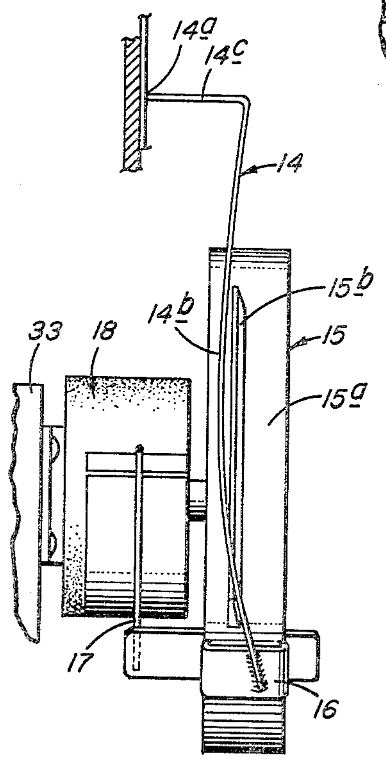
Fig. 4 is a vertical sectional view taken along the line IV—IV of Fig. 3.

During high speed operation of the device, the stylus wire is subject to vibration and erratic action. It has been found desirable to dampen such action, and in accordance with the present invention, this dampening effect is produced by a peripherally extending flange 15*b* positioned on the outer surface of the element 15. This flange 15*b* may extend through approximately 90° of arc. The anchored end of the straight section 14*b* of the stylus member is attached to the clip 16 at such an angle that, if unrestrained, it would extend through the plane of the record sheet 10 (Fig. 4); and during traverse of the stylus tip 14*a* through its scanning path against the record sheet, the long section 14*b* of the stylus member is bowed, as shown clearly in Fig. 4. This presses the stylus tip against the record sheet during movement through the scanning path. However, as the stylus wraps around the carrier 15 it slides along the front face of the flange 15*b* (Fig. 6), and the flange limits the extent of rearward motion of the stylus tip 14*a* after the latter has passed beyond the record sheet. It also maintains the stylus tip within the width of the curved track section 20*b* during its traverse thereof. During movement of the stylus section 14*c* through the spirally expanding portion of the track section 20*b* (Figs. 7 and 8) the section 14*b* of the stylus gradually slides off the flange 15*b* with sliding friction thereagainst, which dampens undesired vibrations thereof. By the time the stylus section 14*c* reaches the upper end of the guide member 20*a*, the long stylus section 14*b* contacts the flange 15*b* at a point so close to the stylus clip 16 that it is largely ineffective to restrain the stylus tip against rearward movement, and such movement is limited only by contact with the record sheet.

As shown in Figs. 1 and 3, the plane of the carrier 15 intersects the plane of the record sheet at a slight angle, and the general plane of the track 20 is slightly inclined at an opposite angle with respect to the record sheet 10. It is found in actual operation that this particular slight departure from parallelism of the stylus carrier and the track with respect to the record sheet is desirable for smoothest operation. However, it is to be understood that it is not essential to the invention, and it is merely essential that the plane of the carrier 15 and the track 20 be approximately parallel to the record sheet 10.

The arrangement described, with reference to Fig. 3, in which the plane of the carrier 15 is substantially parallel to the record sheet is desirable because the carrier projects only slightly in front of the plane of the record sheet. This facilitates the housing of the apparatus in a relatively shallow (in fore and aft direction) case 30 (Fig. 1) having a window 31 through which the record sheet is viewed.

Figures 5, 6, 7, 8:
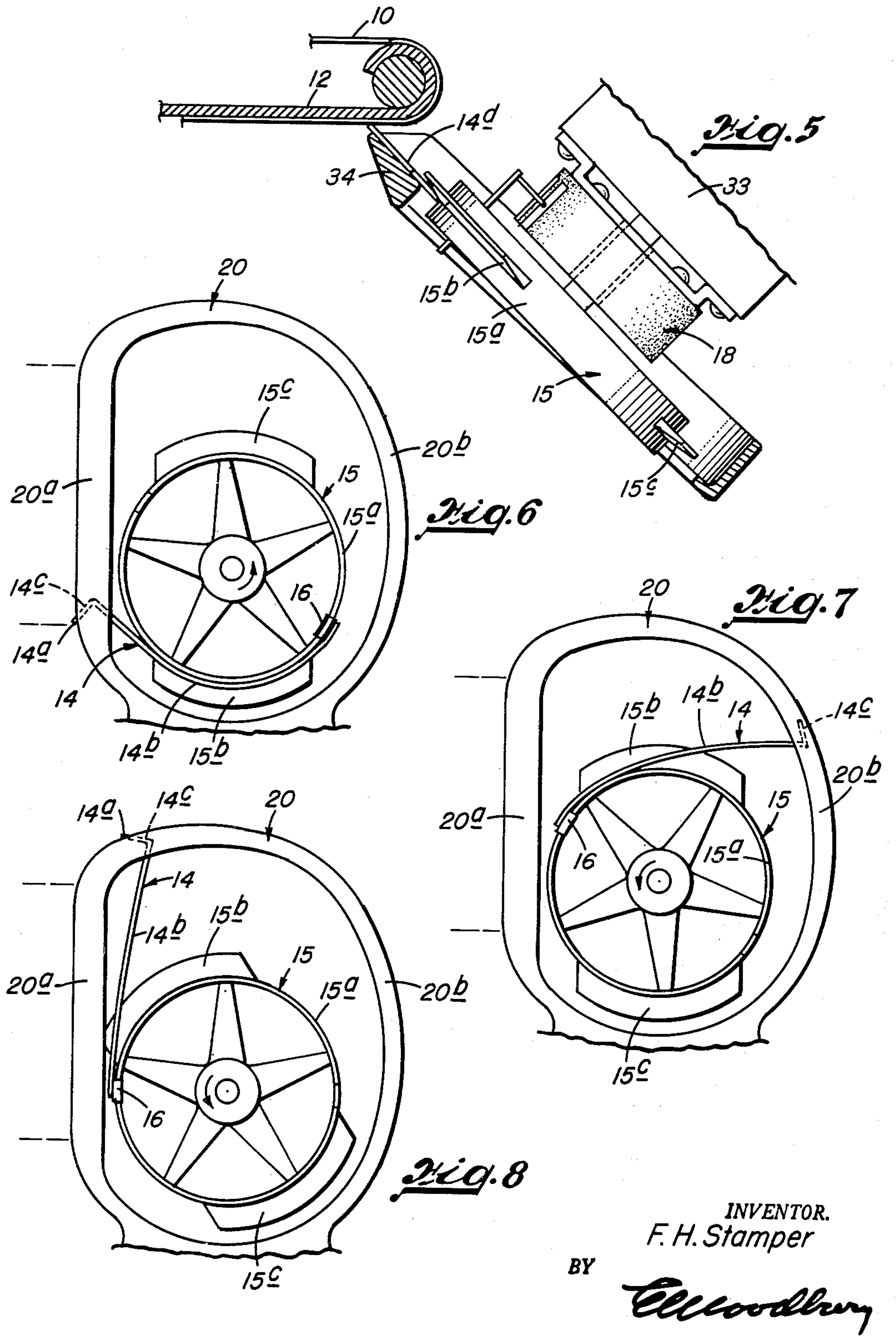
Fig. 5 is a view similar to Fig. 3 but showing an alternative arrangement of the parts.
Figs. 6, 7 and 8 are schematic diagrams illustrating the operation of the device.

However, if desired, the carrier 15 and its supporting and driving motor 33 can be positioned as shown in Fig. 5, in which the plane of the carrier is at a substantial angle to the record sheet. With this arrangement the stylus-contacting surface of the guide member 34 may be approximately parallel to the plane of the carrier, although it is approximately at the same angle to the record sheet as in Fig. 3. In Fig. 5 the short end section 14*d* of the stylus member is substantially in the plane of the carrier, whereas in Fig. 3 the short section 14*c* of the stylus member is at an angle of about 45° to the plane of the carrier.

In general, the arrangement of Fig. 5 is the functional equivalent of that of Fig. 3. In each, the free end of the stylus is at an acute angle to the record sheet whereby the reaction of the latter urges the stylus against the guide member, and the radial force on the stylus due to its resilience and centrifugal force maintains it in positive contact with both the record sheet and the guide.

A second flange 15*c* is shown diametrically opposite the flange 15*b*, but its only function is to counterbalance the weight of the flange 15*b*. Alternatively, the flange 15*b* could be extended all the way around the carrier, but it is desirable to keep the latter as light as possible to reduce the power required to rotate it.

Although for the purpose of explaining the invention, a particular embodiment thereof has been shown and described, obvious modifications will occur to a person skilled in the art, and I do not desire to be limited to the exact details shown and described.

I claim:

1. Apparatus of the type described comprising: means for supporting and moving a sheet record in transversely flat shape through a fixed record path past a fixed scanning path extending transversely across said record path; a scanning mechanism positioned entirely on the front side of said record path and including a stylus carrier and an elongated resilient stylus member attached at one end to said carrier and having a free scanning end; means rotatably supporting said carrier for continuous rotation about a fixed axis, and means for rotating it; said resilient stylus member when unrestrained extending from its point of attachment to said carrier in a direction having a radial component away from said axis; and means including a guide member positioned on the front side of said record path adjacent and parallel to said scanning path, and in the plane of rotation of a portion of said stylus member adjacent the end thereof for contacting said portion of the stylus member during the scanning portion of each revolution thereof and deflecting said scanning end into travel through said scanning path, the portion of at least one of said members that contacts the other member being substantially straight and inclined to said record sheet at an acute angle in a plane normal to said scanning path, whereby the stylus member is slideable across said guide member into contact with the record sheet and the reaction of the record sheet urges the stylus member against the guide member.

2. Apparatus according to claim 1 in which said guide member is said one member.

3. Apparatus according to claim 1 in which both of said members are substantially straight and inclined to said record sheet at an acute angle in said normal plane.

4. Apparatus according to claim 1 in which the plane of rotation of said stylus carrier is approximately parallel to said record sheet.

5. Apparatus according to claim 1 in which the plane of rotation of said stylus carrier is in front of and inclined with respect to said record sheet in the same sense as the said contact surface of said one member.

6. Apparatus according to claim 2 in which said guide member constitutes a portion of a closed track approximately in the plane of rotation of said stylus member and engaging and guiding said stylus throughout each revolution of the stylus member.

7. Apparatus according to claim 1 in which said carrier has a peripheral surface with respect to which said one end of said stylus is substantially tangential and about which said stylus member winds during travel of said free end through said scanning path, and a peripherally extending flange on said peripheral surface positioned to slideably engage the stylus member as it winds and unwinds.

8. Apparatus according to claim 7 in which the side of said track adjacent said record sheet is open and said stylus member contacts the side of said flange remote from said open side of said track.

9. Apparatus according to claim 1 in which said carrier consists of a wheel having a rim and said stylus member comprises at said one end thereof a spring clip bridging said rim and yieldably engaging the edge thereof for attaching said stylus to said carrier.

References Cited in the file of this patent

UNITED STATES PATENTS

| | | |
|---|---|---|
| 2,278,919 | Erickson et al. | Apr. 7, 1942 |
| 2,591,138 | Cooley | Apr. 1, 1952 |
| 2,614,903 | Stamper et al. | Oct. 21, 1952 |